US006680978B1

(12) United States Patent
Schneider et al.

(10) Patent No.: US 6,680,978 B1
(45) Date of Patent: *Jan. 20, 2004

(54) METHOD AND APPARATUS FOR NONLINEAR FILTERING AND CONTROLLING THE PEAK-TO-AVERAGE RATIO

(75) Inventors: Kevin W. Schneider, Hunstville, AL (US); Richard L. Goodson, Huntsville, AL (US); Steven R. Blackwell, Huntsville, AL (US); Fred T. Y. Chu, Madison, AL (US)

(73) Assignee: Adtran, Inc., Huntsville, AL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/260,863

(22) Filed: Mar. 1, 1999

(51) Int. Cl.[7] .............................................. H04B 14/04
(52) U.S. Cl. ....................................... 375/242; 375/290
(58) Field of Search ................................ 375/242, 295, 375/296, 261, 290, 286, 260, 263

(56) References Cited

U.S. PATENT DOCUMENTS

| | | | | |
|---|---|---|---|---|
| 3,955,150 A | * | 5/1976 | Soderstrand | ................ 330/103 |
| 5,021,756 A | * | 6/1991 | Tajima et al. | ................ 333/132 |
| 5,162,812 A | | 11/1992 | Aman et al. | ................... 375/34 |
| 5,249,200 A | | 9/1993 | Chen et al. | .................... 375/58 |
| 5,263,051 A | * | 11/1993 | Eyuboglu | .................... 375/254 |
| 5,388,124 A | | 2/1995 | Laroia et al. | ................... 375/17 |
| 5,488,633 A | | 1/1996 | Laroia et al. | ................ 375/262 |
| 5,513,216 A | | 4/1996 | Gadot et al. | ................ 375/233 |
| 5,809,033 A | * | 9/1998 | Turner et al. | ................ 370/522 |
| 5,881,108 A | * | 3/1999 | Herzberg et al. | ........... 375/296 |
| 6,389,138 B1 | * | 5/2002 | Li et al. | ...................... 375/261 |

OTHER PUBLICATIONS

"Tomlinson Precoding and DFE PAM: An Analytical Comparison for Recursive and Non–Recursive Equalizers", Nicolas J. Lynch–Aird, British Telecom Research Laboratories, Sep. 24–27, 1990 (Portland Meeting).

"Matched–Transmission Technique for Channels With Intersymbol Interference", Hiroshi Harashima and Hiroshi Miyakawa, IEEE Transactions on Communications, Vol. Com–20, No. 4, Aug. 1972.

"Dynamics Limited Shaping for Fast Digital Transmission", Robert F. H. Fischer and Johannes B. Huber, ©1995 IEEE.

"PAR Reduction with Minimal or Zero Bandwidth Loss and Low Complexity (98–173)", José Tellado and John M. Cioffi, Information Systems Laboratory, Stanford University, Stanford, CA, Jun. 1–5, 1998.

"Unified Framework for PAR Control in Multitone Systems", Aradhana Narula and Frank Kschischang, Motorola ISG, M4–10, Mansfield, MA, Jun. 1–5, 1998.

* cited by examiner

Primary Examiner—Mohammad H. Ghayour
Assistant Examiner—Kevin M Burd
(74) Attorney, Agent, or Firm—Thomas, Kayden, Horstemeyer & Risley, L.L.P.

(57) ABSTRACT

A method and apparatus for providing a precoder filter having peak-to-average ratio (PAR) controller that also serves as a high-pass, low-pass, or band-pass filter. The described invention is includes a modulo device connected in series with the PAR controller and a precoder filter connected in a feedback arrangement. The input to the apparatus is a sequence of data symbols and the output is a spectrally shaped precoded signal having a controlled peak-to-average ratio.

29 Claims, 14 Drawing Sheets d(n) - Data Symbol
a(n) - Adjusted Data Symbol
f(n) - Filtered Precoded Signal
p(n) - Precoded Signal
m(n) - Modulo Signal

METHOD AND APPARATUS FOR NONLINEAR FILTERING AND CONTROLLING THE PEAK-TO-AVERAGE RATIO

FIELD OF THE INVENTION

The present application relates to telecommunication systems, and more specifically, to a method and apparatus for filtering and controlling the peak-to-average ratio of a transmitted signal. A precoder comprising a modulo operator, a feedback filter, and a peak-to-average ratio (PAR) controller provide a novel means for processing a data symbol in a data communication transmitter. The precoder has an output with a limited magnitude and a predetermined spectral shape. Several benefits are simultaneously provided by the precoder including a controlled PAR, an attenuation of unwanted frequencies and a reduction in processing complexity.

BACKGROUND OF THE INVENTION

It is well known by those skilled in the art that the performance of a data communication system may be significantly improved by using Tomlinson precoding ("precoding"). Typically, preceding eliminates much of the distortion, or intersymbol interference (ISI), caused by the transmission channel coupling a transmitter and a receiver. U.S. Pat. No. 5,162,812, for example, discloses a generalized partial response precoder (GPRP) device in the transmitter that performs generalized partial response signaling (GPRS) precoding for preventing certain intersymbol interference from being injected into a received signal.

Although there are alternatives to preceding, such as decision feedback equalizers (DFE's), a precoder has advantages in certain data communication systems. A primary advantage of preceding, for example, is the elimination of error propagation. Precoding can therefore be used with coding schemes, such as trellis coded modulation (TCM), to achieve realizable and reliable soft-decision decoders.

A precoder is usually initialized during a training mode by sending a training signal from a transmitter to a receiver having a DFE. During the training mode, DFE coefficients are generated in the receiver and then transferred back to the transmitter via a return or back channel coupled to the transmitter. The transferred DFE coefficients are then used by a precoder feedback filter and are typically referred to as precoder coefficients or "precoder taps".

In a conventional data communication system, a precoder receives a data coded signal and converts it into a precoded signal. The data coded signal may be generated using a variety of modulation schemes, such as pulse amplitude modulation (PAM), quadrature amplitude modulation (QAM), carrierless AM/PM modulation (CAP), discrete multi-tone (DMT) or other schemes known to those skilled in the art. The precoded signal then passes through a digital-to-analog converter, a shaping filter and other transmitter circuits.

A principal disadvantage of a conventional precoder is that no means are provided for controlling the peak-to-average ratio (PAR) at the output of the transmitter line driver. If the transmitter line driver output has a high PAR, then the transmit circuits of the transmitter may clip some of the peaks from the precoded signal. If frequent clipping occurs, the bit error ratio (BER) associated with the received signal at the receiver may increase and thus degrade the performance of the communication system. Therefore, it is desirable to have a communication system capable of limiting or controlling the peak value of the transmitter line driver output.

It is also desirable in some transceivers having echo cancellation for the output thereof to have both a low PAR and low values for low frequency components (including DC). For example, a high-pass filter having both a DC null of around −15 decibels and an output with a limited value may meet the specifications for many transmitters. Typically, a shaping filter cannot provide a low value for PAR, but can provide low values for low frequencies and DC. Hence, there is a need to have an apparatus for providing a low PAR while simultaneously keeping the DC null at or below a specified value.

Further, it would be desirable for such an apparatus to be easily implemented within the structure of an existing transmitter.

SUMMARY OF THE INVENTION

Therefore, an object of the present invention is to use a precoder to limit the maximum output of the transmitter line driver. When the peak output of the transmitter line driver is reduced, then the specifications of the line driver may be relaxed thereby providing a reduction in cost for the transmitter circuits.

Another object of the present invention is to provide spectral shaping within the precoder, thereby reducing the need for a separate spectral shaping filter. When spectral shaping is provided within the precoder, the processing requirements of a digital signal processor in the transmitter may be reduced.

Yet another object of the present invention is to provide spectral shaping within the precoder without reducing the performance of the data communication system.

It is a further object of the present invention to take advantage of the properties of modulo devices within the transmitter and receiver. For example, using modulo devices in the transmitter and receiver in conjunction with the present invention provides good data communication performance.

The above objects indicate a need for an improved method and apparatus for performing precoding functions. Further, the apparatus and method should be cost effective and have parameters that may be changed to meet various user requirements.

Hence, a precoder is provided that includes: a summer for combining a data symbol and a filtered precoded symbol and outputting an adjusted data symbol; a modulo device having an upper boundary and a lower boundary for receiving the adjusted data symbol and outputting a bounded modulo signal; and a peak-to-average ratio (PAR) controller coupled to the modulo device for generating a control signal, combining the control signal with the modulo signal so as to selectively adjust the bounds of the modulo signal, and outputting the precoded signal, wherein the combined modulo signal and control signal is the precoded signal. A precoder filter coupled to the PAR controller in a feedback arrangement is further provided for outputting the filtered precoded symbol to the summer. Advantageously, the PAR controller can be arranged so as to provide high-pass filter, low-pass filter or band-pass filter functionality.

In another aspect of the present invention, a method of precoding a data symbol is provided having the steps of: receiving the data symbol; combining the data symbol with a filtered precoded signal to generate an adjusted data symbol; performing a modulo operation on the adjusted data symbol to provide a modulo signal; modifying the modulo signal according to an algorithm wherein the output of the modifying step is a precoded signal representing the data symbol; and filtering the precoded signal to generate a new value for the filtered precoded signal.

In addition, a method of simultaneously controlling the peak-to-average ratio and the spectral shape of a precoded signal to be transmitted over a communication channel is provided. The method includes the steps of: receiving a data symbol; combining the data symbol with a filtered precoded signal to generate an adjusted data symbol; performing a modulo operation on the adjusted data symbol to provide a modulo signal; selectively adjusting the value of the modulo signal in accordance with a PAR control algorithm, thereby generating a new value for the precoded signal wherein the new value has a predetermined maximum magnitude; filtering the precoded signal to generate a new value for the filtered precoded signal; and coupling the precoded signal to transmitter circuits for transmission over the communication channel.

Further objects, features and advantages of the invention will become apparent from the following detailed description taken in conjunction with the accompanying figures showing illustrative embodiments of the invention.

BRIEF DESCRIPTION OF THE DRAWINGS

For a complete understanding of the present invention and the advantages thereof, reference is now made to the following description taken in conjunction with the accompanying drawings in which like reference numbers indicate like features and wherein.

DETAILED DESCRIPTION OF THE PREFERRED EMBODIMENT(S)

Figure 1:
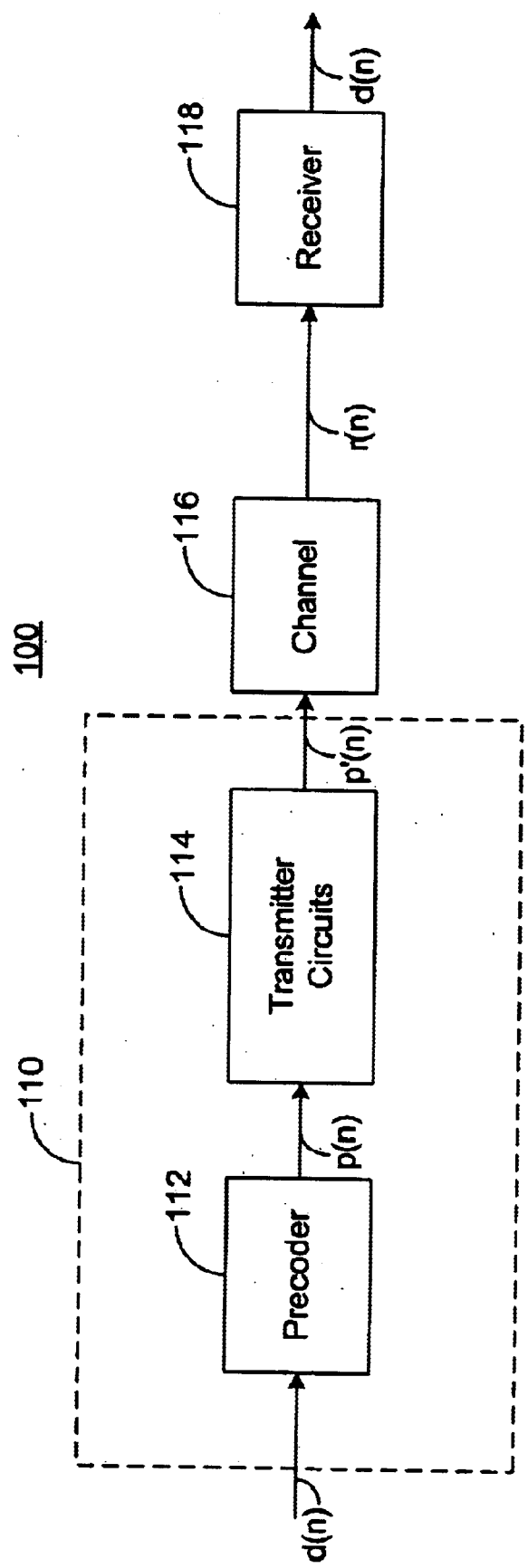
FIG. 1 shows a block diagram of a data communication system having a conventional precoder.
Figure 2:
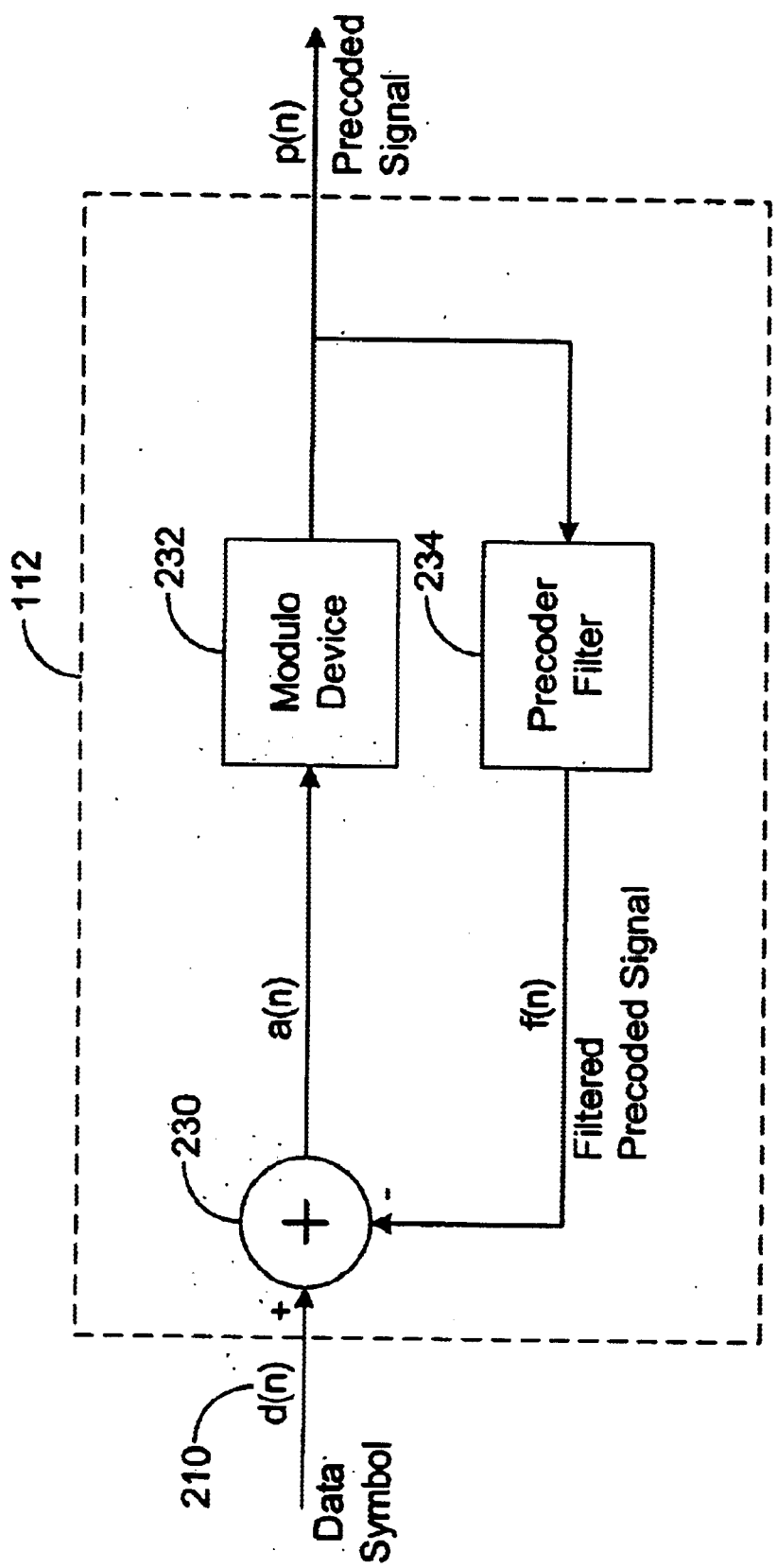
FIG. 2 shows a block diagram of the conventional precoder according to the system FIG. 1.
Figure 3:
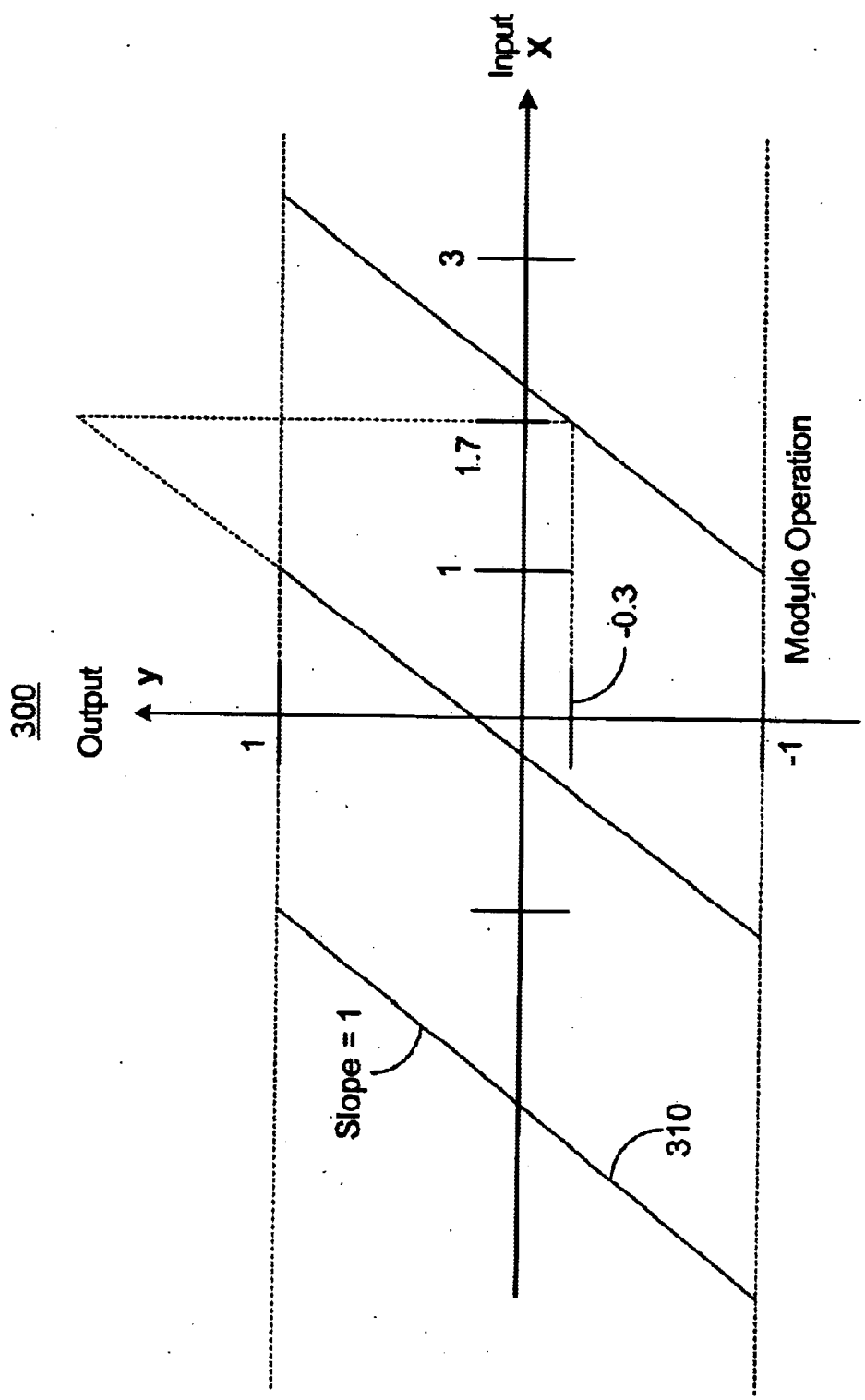
FIG. 3 shows the operation of a conventional modulo device according to the precoder structure of FIG. 2.

For a complete understanding of the present invention and advantages thereof, reference is made to prior art FIGS. 1 through 3.

FIG. 1 shows a conventional communication system 100 having a channel 116 for coupling a transmitter 110 to a receiver 118. The transmitter 110 transmits a transmitter signal p'(n) through the channel 116 to the receiver 118. When the communication system 100 is a data communication system, the transmitter signal p'(n) is a data communication signal that has been processed by a precoder 112 and transmitter circuits 114. The modulation methods for generating the transmitter signal include PAM, QAM, CAP or other modulation methods known and understood by those skilled in the art. Further details regarding the transmitter circuits 114 and receiver 118 are known and understood by those skilled in art.

The transmitter 110 of FIG. 1 includes the precoder 112 coupled to the transmitter circuits 114. When transmitting data, the precoder 112 receives data symbols d(n), processes the data symbols, and generates a precoded signal p(n) for processing by the transmitter circuits 114. The precoder 112 is used to compensate for channel impairments, which typically includes a transmission channel and receiver, thus eliminating distortion or intersymbol inference (ISI) from the received signal r(n). The transmitter circuits 114 typically process the precoded signal and thus provide a transmitter signal having a specified bandwidth and power level.

FIG. 2 shows a block diagram of the conventional precoder 112 according to the system of FIG. 1. The structure of the precoder 112 is well-known in the art, and is described for example in U.S. patent application Ser. No. 09/143,029, which is hereby incorporated by reference and assigned to the assignee of the present invention. As shown in FIG. 2, the precoder 112 includes a summer 230, a modulo device 232 and a precoder filter 234.

The precoder filter 234, typically a finite impulse response (FIR) filter, includes coefficients that are selected so as to eliminate distortion caused by channel impairments. The coefficients of the precoder filter 234 are usually generated in the receiver during a training mode and conveyed to the transmitter prior to the system going into a data receiving mode. The data symbol d(n) is combined at the summer 230 with the output of the precoder filter f(n) to form an adjusted data symbol a(n). A modulo device 232 receives the adjusted data symbol a(n) and generates a precoded signal p(n), which is bounded by the modulo boundaries –N and +N of the modulo device 232 and which is generated in accordance with the modulo operation as shown in FIG. 3.

FIG. 3 shows the operation of a conventional modulo device. It should be noted that a modulo operation in mathematics is similar, but is not the same as the modulo operation of the modulo device 232 in a data communication system. Although modulo devices are known to those skilled in the art of data communication, a brief description is provided herein to assist in the understanding of the present invention.

Referring to FIG. 3, a modulo device having a modulo input x and modulo boundaries –N and +N, where N =1, a modulo device output y=x+2K, is desired such that $-1 \leq x+ 2K<+1$ for all negative and positive integers K. In the example of FIG. 3, the magnitude of the modulo output signal y is thus limited by the modulo boundaries [+1, −1). For example, when the modulo input x is 0.5, the modulo output y is 0.5 since the diagonal lines 310 have a slope equal to 1. When the modulo input is equal 1.70, however, the modulo output is −0.3 as shown in FIG. 3. The integer K for the present example is −1. The modulo device 232, as shown, limits the modulo output y to a value of [+1, 1) when N=1. Other values of N can be selected and fall within the scope of the present invention.

Figure 4:
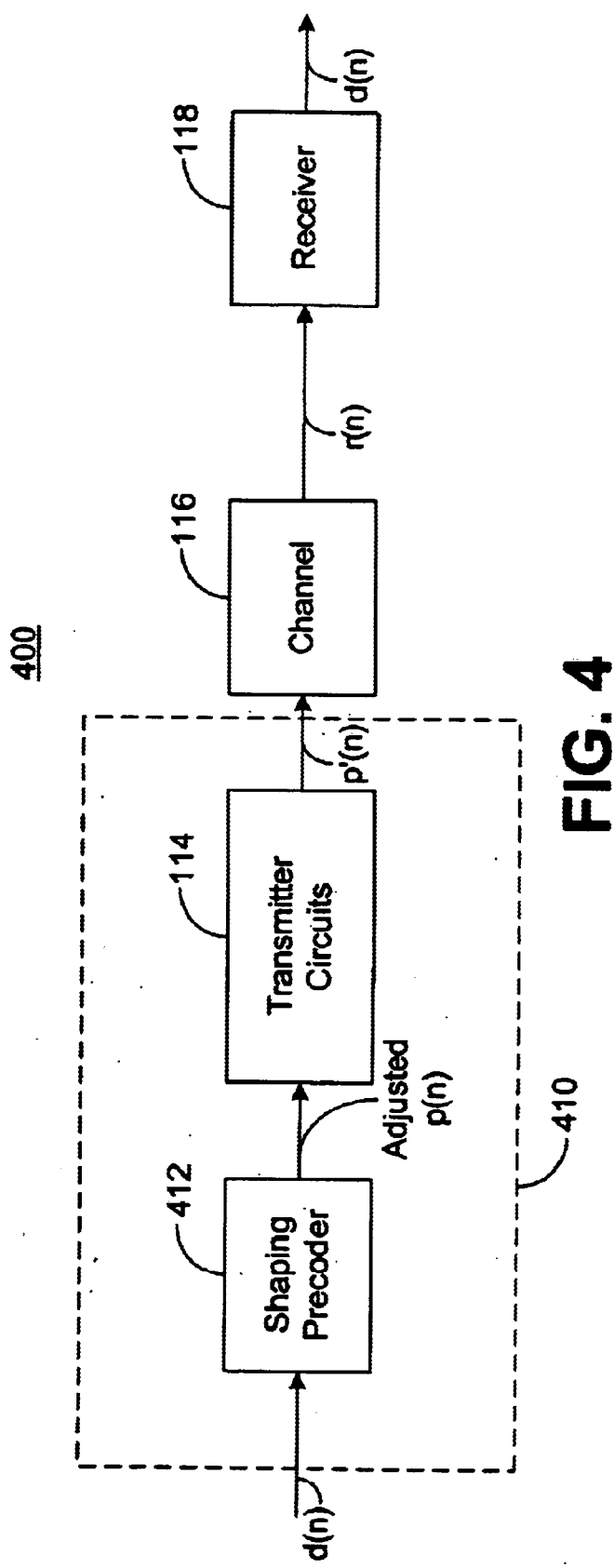
FIG. 4 shows a block diagram of a data communication system having a shaping precoder in accordance with the present invention.
Figure 5:
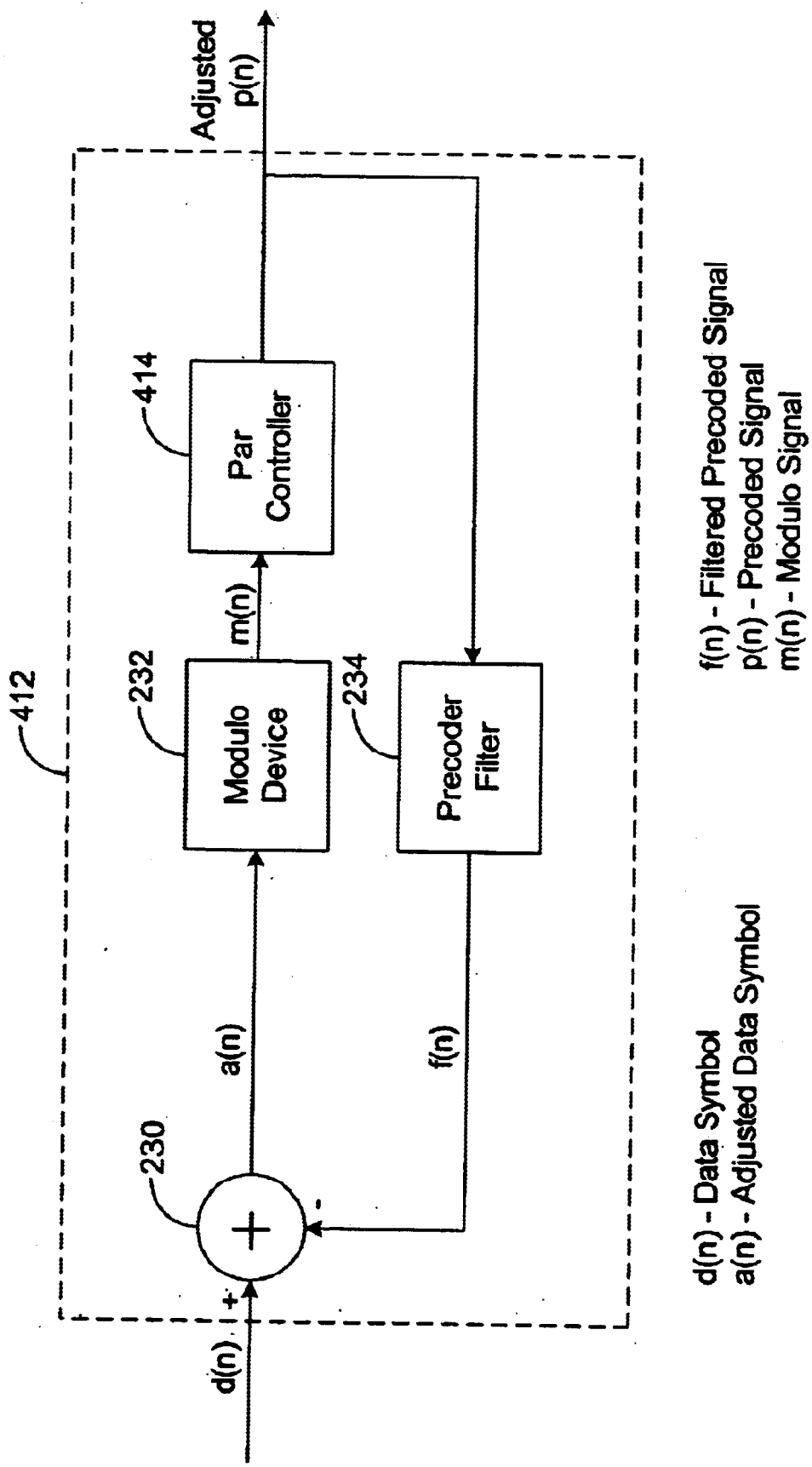
FIG. 5 shows a preferred embodiment of the shaping precoder of FIG. 4.
Figure 7:
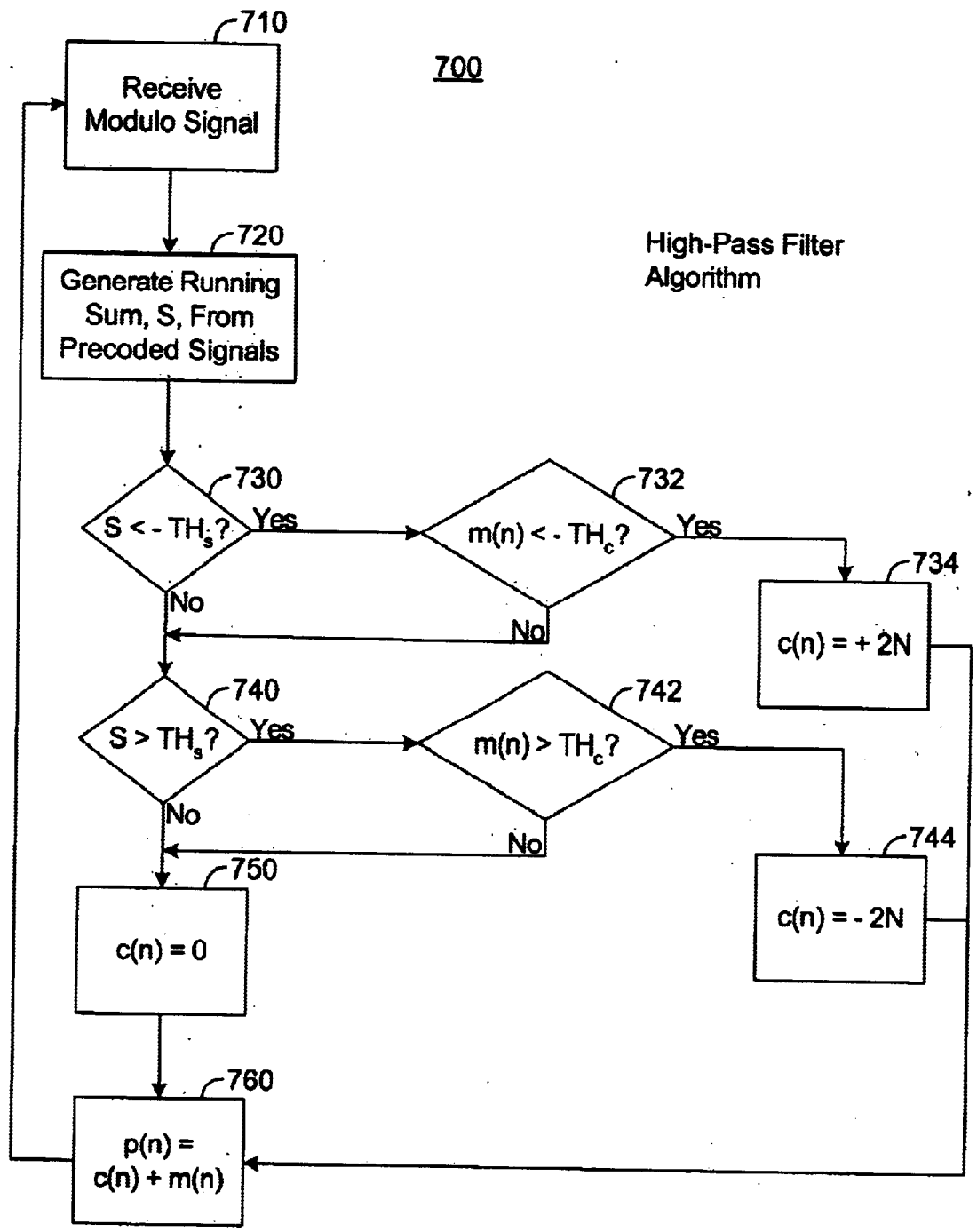
FIG. 7 is a flow chart of a preferred embodiment of a PAR controller algorithm providing high-pass filter functionality to the shaping precoder of FIG. 5.
Figure 11:
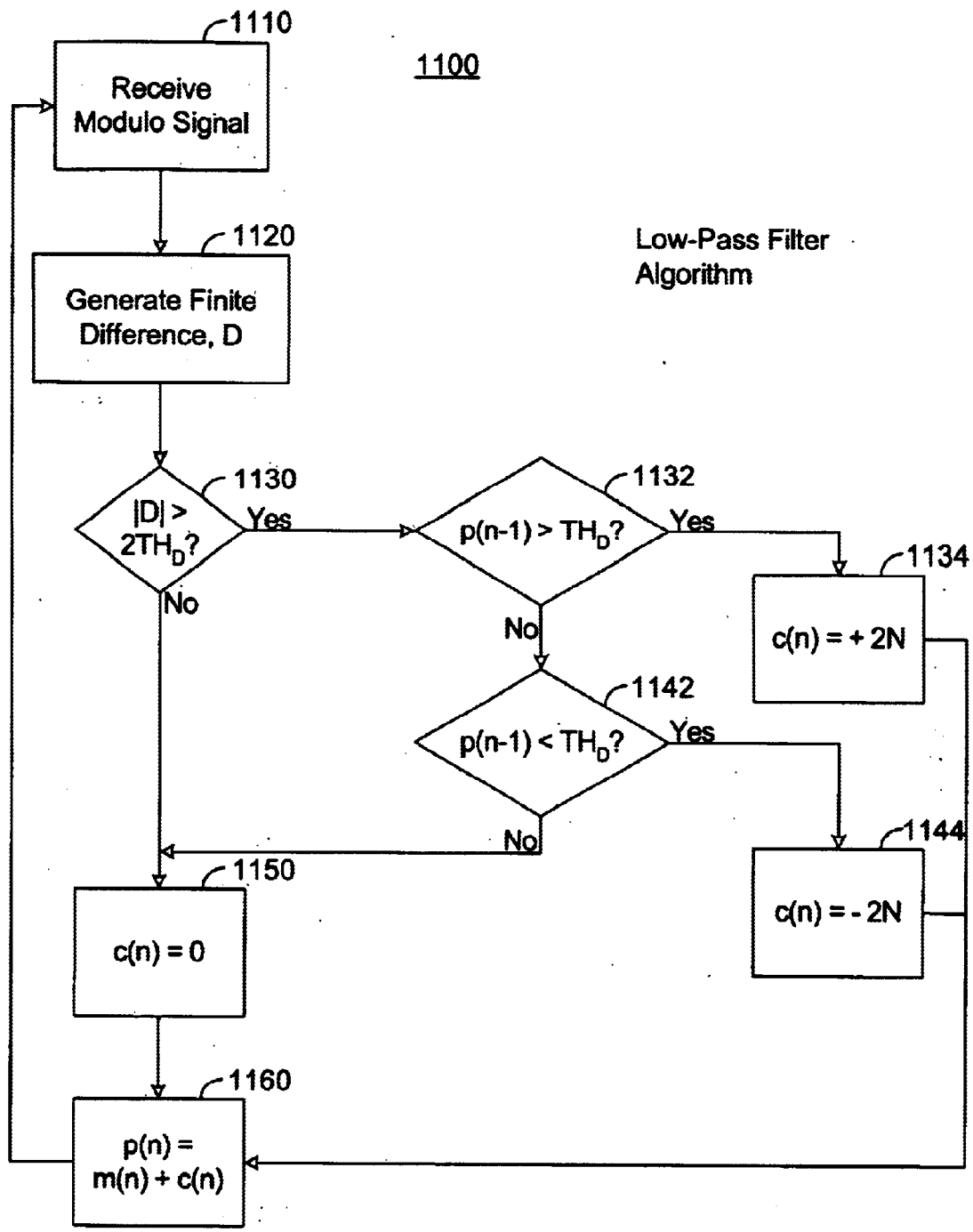
FIG. 11 is a flow chart of a preferred embodiment of a PAR controller algorithm for providing low-pass filter functionality to the shaping precoder of FIG. 5.

FIG. 4 shows a block diagram of a data communication system 400 having a shaping precoder 412 in accordance with the present invention. A preferred embodiment of the shaping precoder 412, as shown in FIG. 5, includes a summer 230, a modulo device 232, a PAR controller 414 and a precoder filter 234. The modulo device 232 and precoder filter 234 operate as described for the conventional precoder 112 of FIG. 2. In the present embodiment, however, a PAR controller 414 is further included for processing the modulo signal m(n) and generating the precoded signal p(n) according to selectable PAR controller algorithm, for example, as shown in FIGS. 7 and 11 described below.

The PAR controller 414, by means of the selected PAR controller algorithm, allows the precoder 412 to both eliminate channel impairments and serve as either a high-pass filter, a low-pass filter or a band-pass filter, depending upon the algorithm selected. Hence, the precoder 412 provides the function of the conventional precoder 112 and further serves as a shaping filter. Further, because the precoder output p(n) is filtered, additional transmitter shaping and filtering by the transmitter circuits 114 is not required.

In a preferred embodiment of the present invention, as further described below with reference to FIG. 7, the PAR controller 414 selectively changes the bounds of the modulo signal m(n) according to a high-pass shaping algorithm. The precoder output p(n), when using the high-pass shaping algorithm, thus contains very little low-frequency energy and provides a DC null. Hence, the precoder 412 simultaneously cancels channel impairments and serves as a high-pass filter. In another embodiment, as shown in FIG. 11, the PAR controller selectively changes the bounds of the modulo signal m(n) according to a low-pass shaping algorithm.

Figure 6:
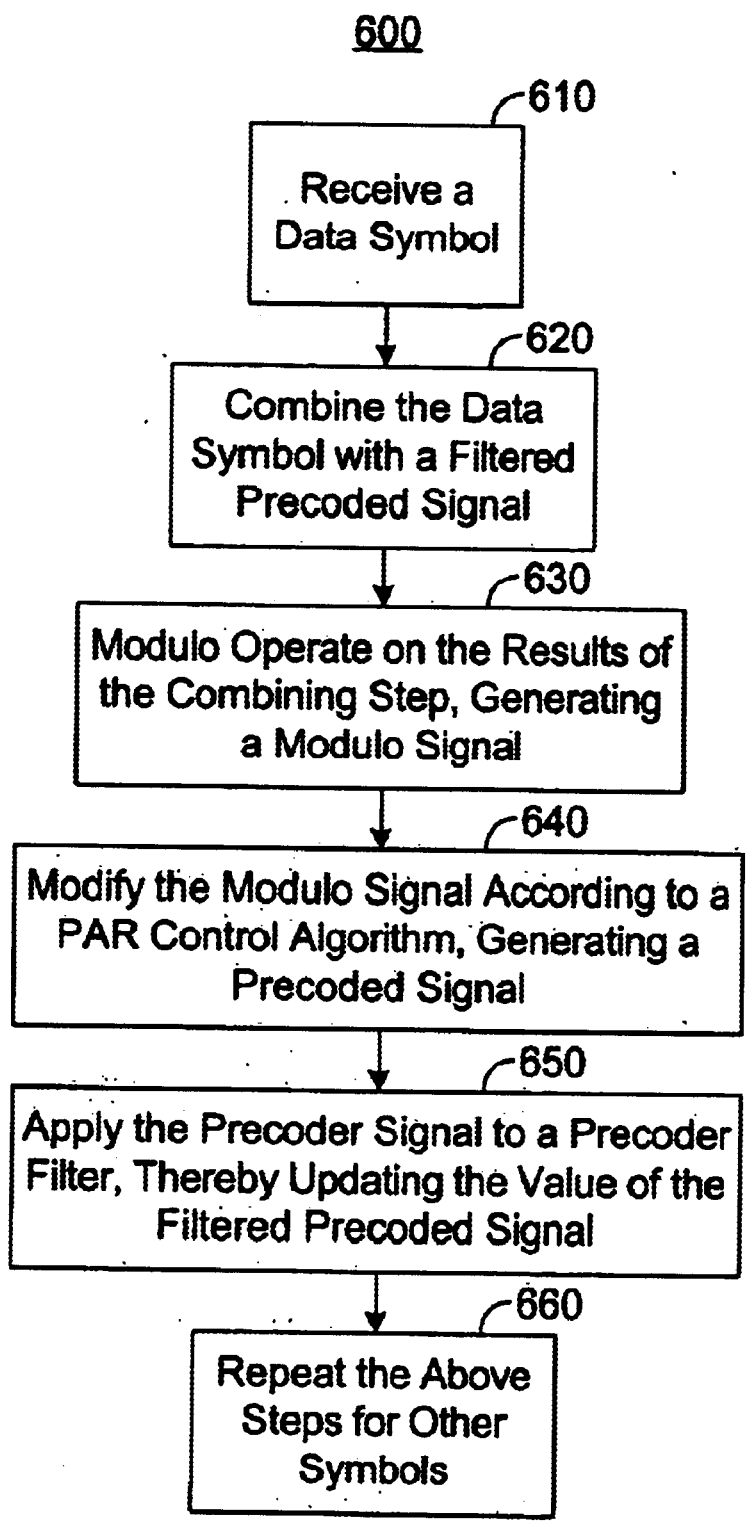
FIG. 6 is a flow chart showing a preferred method in accordance with the present invention.

FIG. 6 shows a preferred method 600 in accordance with the present invention. As shown in FIG. 6, a data symbol is received, step 610, and then combined with a filtered precoded signal, step 620. A modulo operation, step 630, then generates a modulo signal limited in value between −N and +N. The modulo signal is then modified according to a PAR control algorithm, as described below and shown in FIGS. 7 and 11, to generate a precoded signal, step 640. The precoded signal is sent to transmit circuits and is applied a precoder filter, thereby generating a new value for the filtered precoded signal, step 650. The above steps are then repeated for subsequent data symbols, step 660.

FIG. 7 is a flow chart of a preferred embodiment of a PAR controller algorithm 700 for providing high-pass filter functionality to the precoder of FIG. 5. As shown in FIG. 7, a modulo signal m(n) is received from a modulo device, step 710, which is used to generate an accumulator signal, or running sum S(n), in accordance with equation S(n)=S(n−1)+p(n−1), step 720, wherein S(n−1) is the previous value of the running sum and p(n−1) is the previous value of the precoder output. S(n) thus represents the summation S(n)= Σp(n) wherein S(n) is a DC or low frequency content detector.

Next, the running sum S(n) is compared to the negative value of a summer threshold, −$TH_S$, step 730. If S(n) is less than −$TH_S$, then the received modulo signal m(n) is compared to the negative value of a correction threshold $TH_C$, step 732. Otherwise, processing continues and the running sum S(n) is compared to the positive value of summer threshold +$TH_S$, step 740.

Note, the summer threshold $TH_S$ of steps 730 and 740 represents a DC offset for the received modulo signal m(n), which is nominally set to zero. The correction threshold $TH_C$ is used to define regions around each of the modulo boundaries N and −N and to determine when a control signal c(n) is to be added to the received modulo signal m(n), thereby selectively changing the bounds of the modulo device in the precoder and its output p(n). Nominally, the summer threshold $TH_C$ is set to between 0.5N and N so as to provide high-pass filtering for the precoder and maintain low PAR values. $TH_C$ may however be any value between 0 and N.

Referring again to FIG. 7, if the modulo signal m(n) is less than the negative value of the correction threshold −$TH_C$, then the control signal c(n) is set to +2N, step 734, and then added to the modulo signal m(n) such that the output of the precoder p(n) is equal to m(n)+2N, step 760. Otherwise, if the modulo signal m(n) is greater than or equal to the negative value of the correction threshold −$TH_C$, then the running sum S(n) is compared to the positive value of the summer threshold +$TH_S$, step 740. If S(n) is less than or equal to +$TH_S$, then the control signal c(n) is set to zero and the precoder output p(n) is simply the modulo signal m(n), step 750.

However, if in accordance with step 740 S(n) is greater than +$TH_C$, then the modulo signal m(n) is compared to the positive value of the correction threshold +$TH_C$, step 742. If m(n) is greater than +$TH_C$, then the control signal c(n) is set to −2N, step 744, and the precoder output p(n) becomes m(n)−2N, step 760.

Therefore, as shown by step 760, once c(n) has been set by either of the steps 734, 744, or 750, then the new value for the precoded signal p(n) is equal to c(n)+m(n), wherein the control signal c(n) can be generalized as: c(n)=+2N for S(n)<−$TH_S$ and m(n)<−$TH_C$; −2N for S(n)>+$TH_S$ and m(n)>+$TH_C$; or 0 elsewhere. Thus, when the running sum S(n) is greater than or less than a certain threshold in accordance with steps 730, 732, 740, and 742, the precoder output p(n) is adjusted or "flipped" so as to oppose the growth of the running sum S(n).

Figure 8:
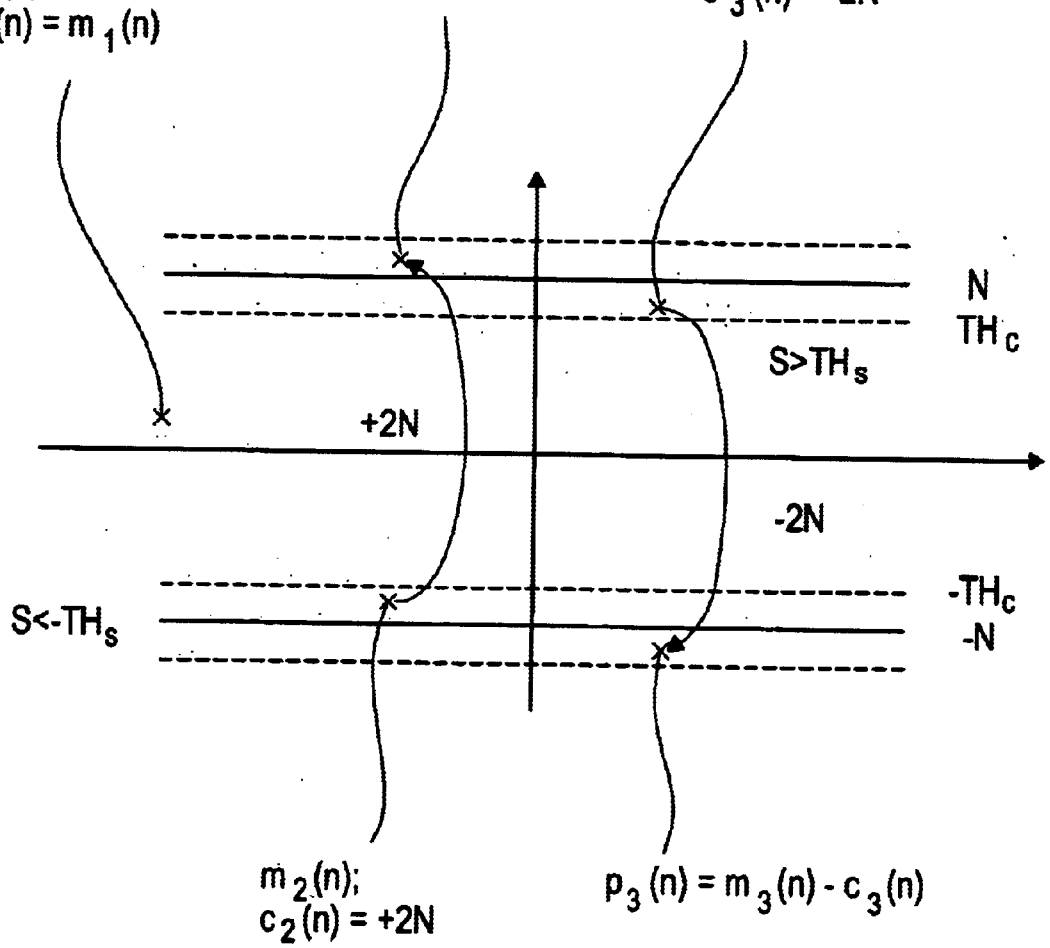
FIG. 8 illustrates the operation of the PAR controller algorithm of FIG. 7.

FIG. 8 illustrates the operation of the above-described high-pass algorithm 600 as applied to exemplary modulo signals $m_1(n)$, $m_2(n)$ and $m_3(n)$. In the case of modulo signal $m_1(n)$(CASE 1), where the modulo signal lies away from the boundaries N, −N, for example within the region −$TH_C$ to +$TH_C$, then the corresponding control signal $c_1(n)$=0 and the corresponding precoder output $p_1(n)=m_1(n)$. In the case of the modulo signal $m_2(n)$(CASE 2), where the running sum S(n) is less than the negative value of the summer threshold −$TH_S$ and $m_2(n)$ is less than the negative value of the correction threshold −$TH_C$, the corresponding control signal $c_2(n)$ equals +2N and the corresponding precoder output $p_2(n)$ is equal to the modulo signal $m_2(n)$ adjusted by $c_2(n)$. Lastly, in the case of modulo signal $m_3(n)$(CASE 3), where the running sum S(n) is greater than the positive value of summer threshold +$TH_S$ and $m_3(n)$ is less than the positive value of the correction threshold +$TH_C$, then the corresponding control signal $c_3(n)$ equals −2N and the corresponding precoder output $p_3(n)$ is equal to the modulo signal $m_3(n)$ adjusted by $c_3(n)$.

Figure 9:
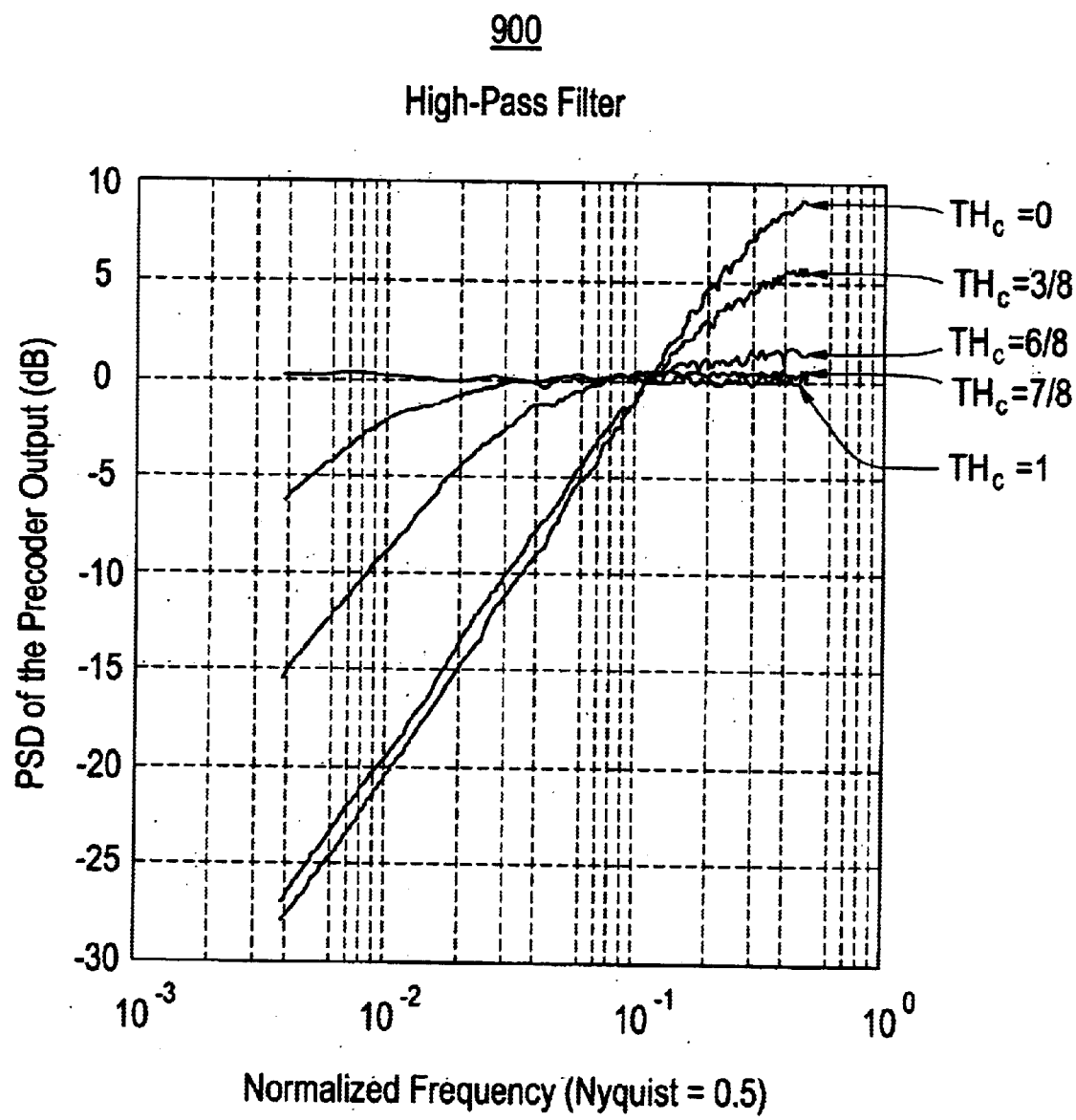
FIG. 9 shows the frequency response of a high-pass shaping precoder in accordance with the algorithm of FIG. 7.

FIG. 9 shows the frequency response (PSD) of a high-pass precoder versus $TH_C$, wherein $TH_C$ is a design parameter for the precoder and $TH_S$ is equal to zero. The normalized frequency values along the abscissa are shown ranging from approximately $5.0 * 10^{-3}$ to 0.5, where 0.5 represents the normalized Nyquist frequency. The PSD values along the ordinate are shown in decibels (dB).

Figure 10:
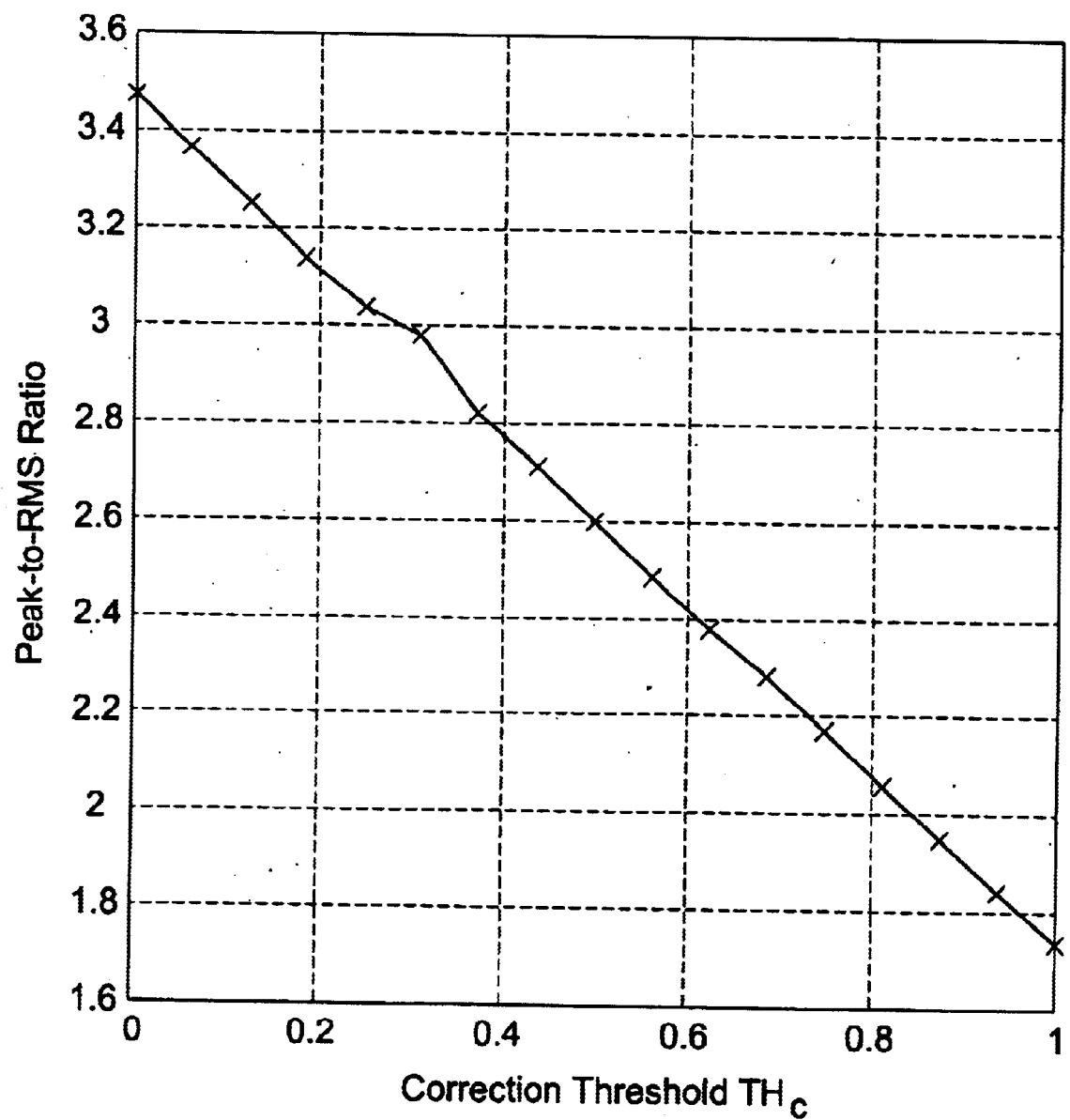
FIG. 10 shows the PAR of a high-pass shaping precoder as a function of the correction threshold in accordance with the algorithm of FIG. 7.

FIG. 10 shows the variations in PAR as a function of $TH_C$. For example, for a $TH_C$ value of 0.8, the resulting PAR is approximately 2.1. By comparison, the PAR for a prior art precoder combined with a conventional high-pass filter for the same value of $TH_C$ is 2.9. Hence, the method of the present invention reduces the output requirements of the transmitter line drivers.

FIG. 11 is a flow chart of a preferred embodiment of a PAR controller algorithm 1100 for providing low-pass filter functionality to the shaping precoder of FIG. 5. As shown in FIG. 11, the low-pass shaping algorithm includes the steps of receiving of the modulo signal m(n), step 1110, and generating a finite difference D(n), step 1120, followed by decision steps 1130, 1132, and 1142, wherein the absolute value of the finite difference D(n) is compared first to two times a difference threshold THD, and wherein the previous value of the precoder output p(n−1) is compared to the same difference threshold $TH_D$. The finite difference D(n) is equal to p(n)−p(n−1), where p(n) is the current precoder output and p(n−1) is the previous precoder output. The difference threshold $TH_D$ nominally has a value of between 0 and N.

Referring again to FIG. 11, a control signal c(n) is assigned one of three values, 0, −2N or +2N, according to steps 1134, 1144 or 1150 depending upon the results of decision steps 1130, 1132, and 1142. After a value is assigned to the control signal c(n), a new value of p(n), p(n)=m(n)+c(n), is computed according to step 1160. The new value of p(n) is sent to the transmitter circuits and the low-pass algorithm repeats the just described steps.

Thus, in accordance with the steps of FIG. 11, the control signal c(n) for a low-pass shaping filter can be generalized as: c(n)=+2N for $|D(n)|>2TH_D$ and p(n−1)>$TH_D$; −2N for $|D(n)|>2TH_D$ and p(n−1)<$TH_D$; or 0 elsewhere Accordingly, when the finite difference D(n) is greater than a certain threshold in accordance with the above algorithm, the precoder output p(n) is adjusted or "flipped" so as to oppose the growth of the finite difference D(n).

Figure 12:
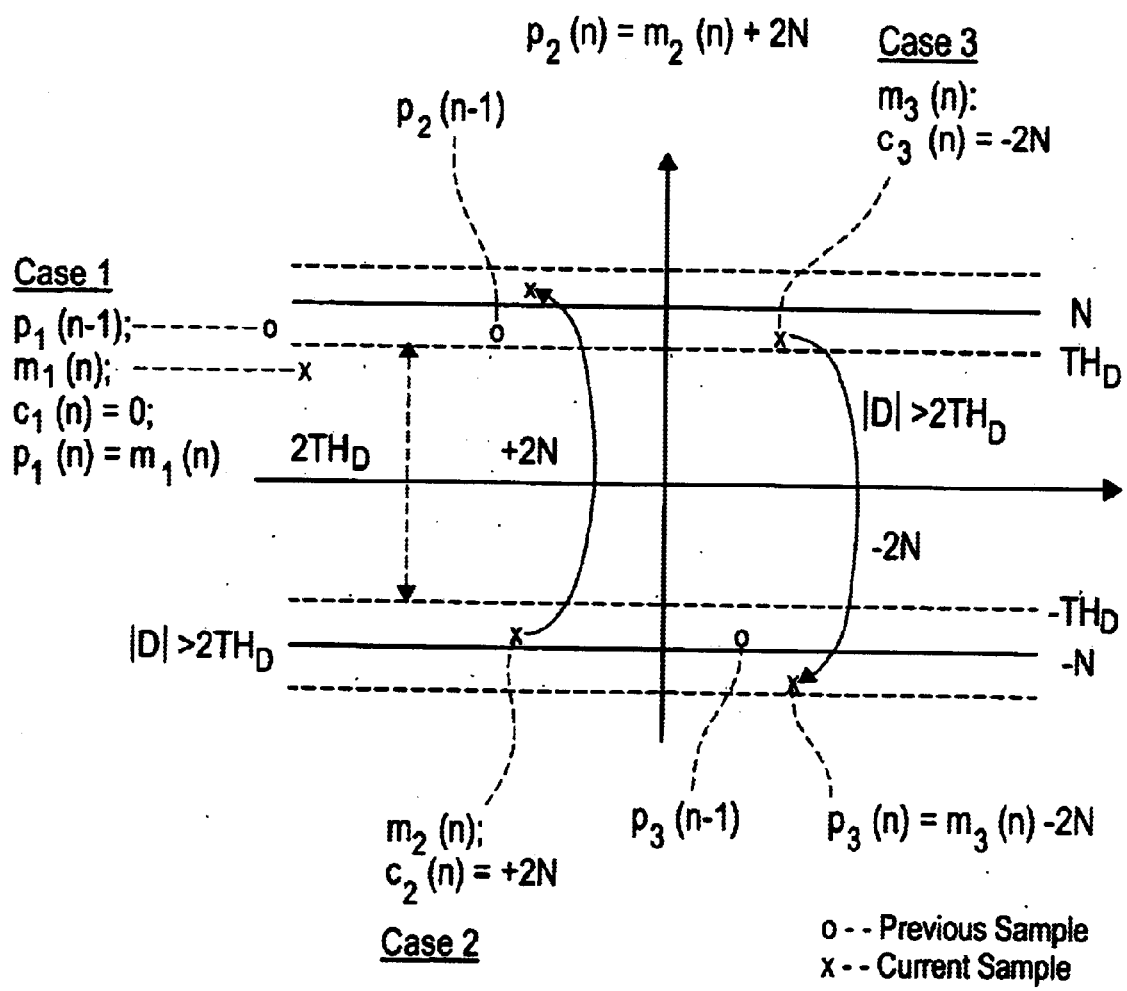
FIG. 12 illustrates the operation of the PAR controller algorithm of FIG. 11.

FIG. 12 illustrates the operation of the above-described high-pass algorithm 1100 as applied to exemplary modulo signals $m_1(n)$, $m_2(n)$ and $m_3(n)$.

In the case of modulo signal $m_1(n)$(CASE 1), the corresponding control signal $c_1(n)=0$ and the corresponding precoder output $p_1(n)=m_1(n)$. In the case of modulo signal $m_2(n)$(CASE 2), where the absolute value of the finite difference D(n) is greater than twice the difference threshold $2TH_D$ and the previous corresponding precoder output $p_2(n-1)$ is less than $TH_D$, the control signal $c_2(n)$ equals +2N and the corresponding precoder output $p_2(n)$ is equal to the modulo signal $m_2(n)$ adjusted by $c_2(n)$. Lastly, in the case of modulo signal $m_3(n)$(CASE 3), where the absolute value of the finite difference D(n) is also greater than twice the difference threshold $2TH_D$, and the previous corresponding precoder output $p_3(n-1)$ is less than $TH_D$, then the corresponding control signal $c_3(n)$ equals −2N and the corresponding precoder output $p_3(n)$ is equal to the modulo signal $m_3(n)$ adjusted by $c_3(n)$.

Figure 13:
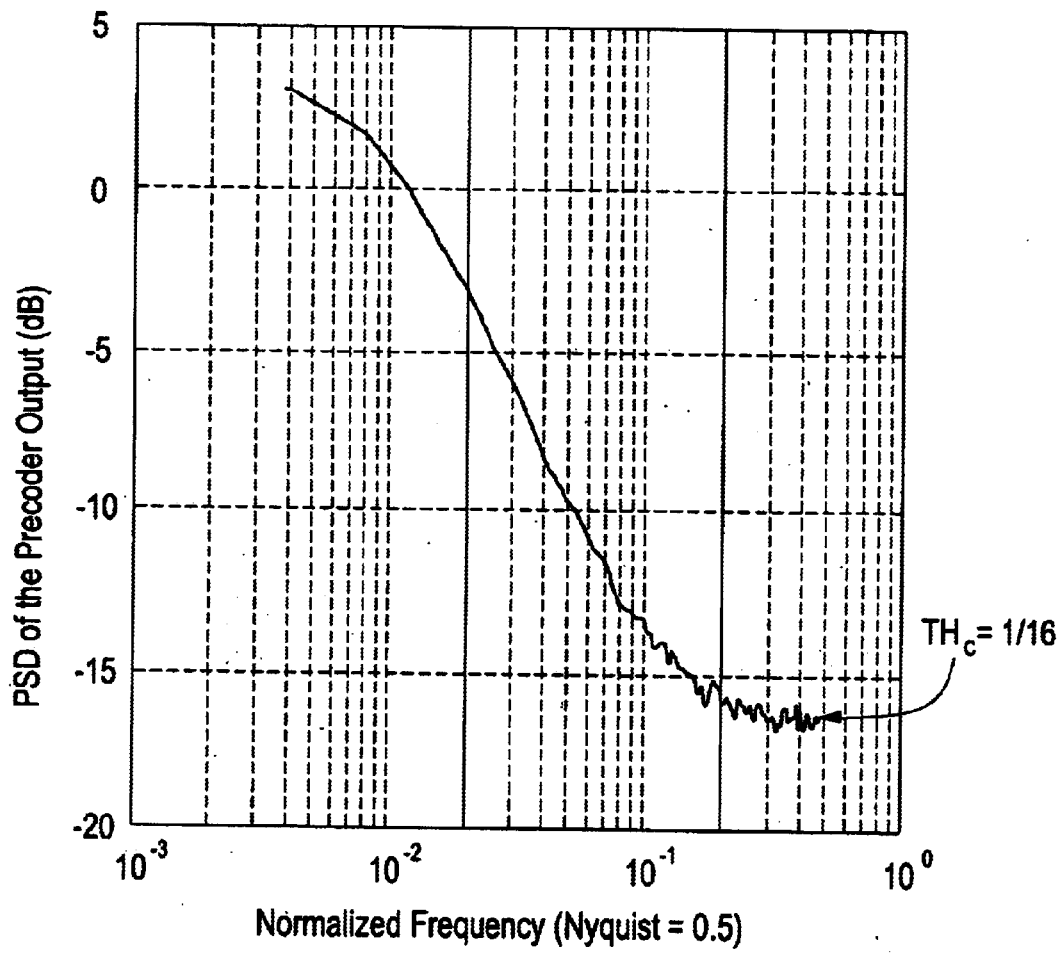
FIG. 13 shows the frequency response of a low-pass shaping precoder in accordance with the algorithm of FIG. 11.
Figure 14:
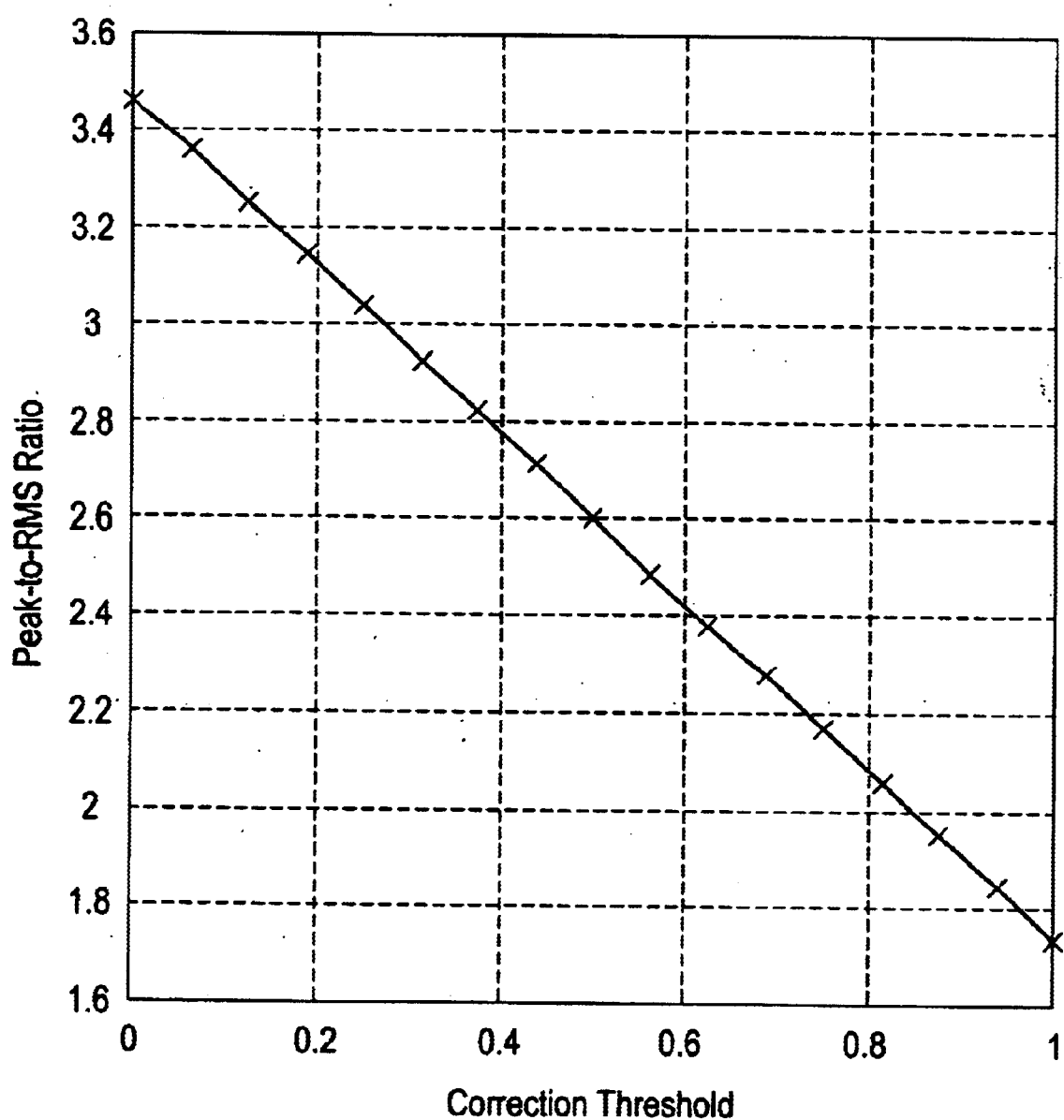
FIG. 14 shows the PAR of a low-pass shaping precoder as a function of the correction threshold in accordance with the algorithm of FIG. 11.

FIG. 13 shows the frequency response of a low-pass filter precoder using the low-pass filter algorithm of FIG. 11. The low-pass filter design parameter is a function of the difference threshold, $TH_D$. FIG. 14 shows the variations in PAR as a function of $TH_D$ for the low-pass filter precoder.

In summary, the addition of a PAR controller to the precoder provides pre-transmission impairment cancellation while limiting the values of the output frequencies of the precoder. In applications where a high-pass filter is required, a PAR controller algorithm can be used that provides a filter having the characteristics of a first order filter high-pass filter. Further if low-pass filtering is required, the PAR controller algorithm can be modified to provide the new precoder 400 with a means for low-pass filtering. A combination of the high-pass and low-pass algorithms can be used to provide band-pass filtering functionality as required.

Although the present invention has been described in connection with particular embodiments thereof, it is to be understood that such embodiments are susceptible of modification and variation without departing from the inventive concept disclosed. All such modifications and variations, therefore, are intended to be included within the spirit and scope of the appended claims. The invention is further defined by the following claims:

What is claimed is:

1. A precoder for filtering a data symbol and providing a precoded signal, comprising:

a summer for combining the data symbol and a filtered precoded symbol and outputting an adjusted data symbol;

a modulo device having an upper amplitude boundary and a lower amplitude boundary for receiving the adjusted data symbol and outputting a bounded modulo signal;

a peak-to-average ratio (PAR) controller coupled to the modulo device for generating a control signal, combining the control signal with the modulo signal so as to selectively adjust the amplitude bounds of the modulo signal such that a PAR of the combined modulo and control signal is reduced with respect to a PAR of the modulo signal, and outputting the precoded signal, wherein the combined modulo and control signal is the precoded signal; and a precoder filter coupled to the APR controller in a feedback arrangement for outputting the filtered precoded symbol to the summer.

2. The precoder according to claim 1, wherein the PAR controller comprises an algorithm for providing high-pass filter functionality.

3. The precoder according to claim 2, wherein the algorithm generates a running sum, S(n), and selectively adjusts the modulo signal, m(n), to generate the precoded signal, p(n), as follows:

if S(n)<−$TH_S$ and m(n)<−$TH_C$, then p(n)=m(n)+2N;

if S(n)>−$TH_S$ and m(n)>$TH_C$ then p(n)=m(n)−2N;

otherwise, p(n)=m(n);

wherein +N is the upper bound of the modulo device and −N is the lower bound of the modulo device, $TH_S$ is a summer threshold and $TH_C$ is a correction threshold.

4. The precoder according to claim 1, wherein the PAR controller comprises an algorithm for providing low-pass filter functionality.

5. The precoder according to claim 4, wherein the algorithm generates a finite difference, D(n), and selectively adjusts the modulo signal m(n) to form the precoded signal, p(n) as follows:

if $|D(n)|>2TH_D$ and p(n−1)>$TH_D$ then let p(n)=m(n)+2N, if $|D(n)|>2TH_D$ and p(n−1)<$TH_D$ then let p(n)=m(n)−2N, otherwise, p(n)=m(n), wherein +N is the upper bound of the modulo device and −N is the lower bound of the modulo device and $TH_D$ is a difference threshold.

6. The precoder according to claim 1, wherein the PAR controller comprises an algorithm for providing band-pass filter functionality.

7. A method of precoding a data symbol comprising the steps of:
   receiving the data symbol;
   combining the data symbol with a filtered precoded signal to generate an adjusted data symbol;
   performing a modulo operation on the adjusted data symbol to provide a modulo signal;
   receiving the modulo signal;
   modifying the received modulo signal according to an algorithm such that modified modulo signal has reduced peak-to-average ratio (PAR) wherein the output of the modifying step is precoded signal representing the data symbol; and
   filtering the precoded signal to generate a new value for the filtered signal.

8. The method according to claim 7, wherein the modifying step comprises the steps of:
   generating a control signal that has the effect of providing high-pass filter functionality;
   combining the control signal with the received modulo signal.

9. The method according to claim 8, wherein the control signal generating step comprises the steps of:
   generating a running sum S(n);
   selecting the control signal c(n) so as to oppose an increase of the running sum.

10. A method of precoding a data symbol comprising the steps of:
   receiving the data symbol;
   combining the data symbol with a filtered precoded signal to generate an adjusted data symbol;
   performing a modulo operation on the adjusted data symbol to provide a modulo signal;
   modifying the modulo signal according to an algorithm such that the modified modulo signal has a reduced peak-to-average ratio (PAR) wherein the output of the modifying step is a precoded signal representing the data symbol, the modifying step comprising the steps of generating a control signal that has the effect of providing high-pass filter functionality and combining the control signal with the modulo signal, wherein the control signal generating step comprises the steps of generating a running sum S(n) and selecting the control signal c(n) so as to oppose an increase of the running sum; and
   filtering the precoded signal to generate a new value for the filtered precoded signal,
   wherein the control signal is selected as follows:
   if $S(n)<-TH_S$ and $m(n)<-TH_C$, then c(n)=+2N;
   if $S(n)>-TH_S$ and $m(n)>TH_C$, then c(n)=−2N;
   otherwise, c(n)=0,
   wherein +N is an upper bound corresponding to the modulo operation and −N is a lower bound corresponding to the modulo operation, $TH_S$ is a summer threshold and $TH_C$, is a correction threshold.

11. The method according to claim 7, wherein the modifying step comprises the steps of:
   generating a control signal that has the effect of providing low-pass filter functionality;
   combining the control signal with the received modulo signal.

12. The method according to claim 11, wherein the control signal generating step comprises the steps of:
   generating a finite difference D(n);
   selecting the control signal c(n) so as to oppose an increase of the finite difference.

13. A method of precoding a data symbol comprising the steps of:
   receiving the data symbol;
   combining the data symbol with a filtered precoded signal to generate an adjusted data symbol;
   performing a modulo operation on the adjusted data symbol to provide a modulo signal;
   modifying the modulo signal according to an algorithm such that the modified modulo signal has a reduced peak-to-average ratio (PAR) wherein the output of the modifying step is a precoded signal representing the data symbol, the modifying step comprising the steps of generating a control signal that has the effect of providing low-pass filter functionality and combining the control signal with the modulo signal, wherein the control signal generating step comprises the steps of generating a finite different D(n) and selecting the control signal c(n) so as to oppose an increase of the finite difference; and
   filtering the precoded signal to generate a new value for the filtered precoded signal,
   wherein the control signal is selected as follows:
   if $|D(n)|>2TH_D$ and $p(n-1)>TH_D$, then c(n)=+2N;
   if $|D(n)|>2TH_D$ and $p(n-1)<TH_D$, then c(n)=−2N;
   otherwise, c(n)=0,
   wherein +N is an upper bound associated with the modulo operation and −N is the lower bound associated with the modulo operation, and $TH_D$ is a difference threshold.

14. The method according to claim 7, wherein the modifying step comprises the steps of:
   generating a control signal that has the effect of providing band-pass filter functionality;
   combining the control signal with the received modulo signal.

15. A method of simultaneously controlling the peak-to-average ratio and the spectral shape of a precoded signal to be transmitted over a communication channel, the method comprising the steps of:
   receiving a data symbol;
   combining the data symbol with a filtered precoded signal to generate an adjusted data symbol;
   performing a modulo operation on the adjusted data symbol to provide a modulo signal;
   receiving the modulo signal;
   selectively adjusting the value of the received modulo signal in accordance with a peak-to-average ratio (PAR) control algorithm such that the adjusted modulo signal has a reduced PAR, thereby generating a new value for the precoded signal;
   filtering the precoded signal to generate a new value for the filtered precoded signal; and
   coupling the precoded signal to transmitter circuits for transmission over the communication channel.

16. The method according to claim 15, wherein the selectively adjusting step comprises the steps of:
   generating a control signal that has the effect of providing high-pass filter functionality;

combining the control signal with the received modulo signal.

17. The method according to claim 16, wherein the control signal generating step comprises the steps of:
generating a running sum S(n);
selecting the control signal c(n) so as to oppose an increase of the running sum.

18. A method of simultaneously controlling the peak-to-average ratio and the spectral shape of a precoded signal to be transmitted over a communication channel, the method comprising the steps of:
receiving a data symbol;
combining the data symbol with a filtered precoded signal to generate an adjusted data symbol;
performing a modulo operation on the adjusted data symbol to provide a modulo signal;
selectively adjusting the value of the modulo signal in accordance with a peak-to-average ratio (PAR) control algorithm such that the adjusted modulo signal has a reduced PAR, thereby generating a new value for the precoded signal, wherein the selectively adjusting step comprises the steps of generating a control signal that has the effect of providing high-pass filter functionality and combining the control signal with the modulo signal, wherein the control signal generating step comprises the steps of generating a running sum S(n) and selecting the control signal c(n) so as to oppose an increase of the running sum;
filtering the precoded signal to generate a new value for the filtered precoded signal; and
coupling the precoded signal to transmitter circuits for transmission over the communication channel,
wherein the control signal is selected as follows:
if $S(n)<-TH_S$ and $m(n)<-TH_C$, then $c(n)=+2N$;
if $S(n)>-TH_S$ and $m(n)>-TH_C$, then $c(n)=-2N$;
otherwise, $c(n)=0$,
wherein +N is an upper bound corresponding to the modulo operation and −N is a lower bound corresponding to the modulo operation, $TH_S$ is a summer threshold and $TH_C$ is a correction threshold.

19. The method according to claim 15, wherein the selectively adjusting step comprises the steps of:
generating a control signal that has the effect of providing low-pass filter functionality;
combining the control signal with the received modulo signal.

20. The method according to claim 19, wherein the control signal generating step comprises the steps of:
generating a finite difference D(n);
selecting the control signal c(n) so as to oppose an increase of the finite difference.

21. A method of simultaneously controlling the peak-to-average ratio and the spectral shape of a precoded signal to be transmitted over a communication channel, the method comprising the steps of:
receiving a data symbol;
combining the data symbol with a filtered precoded signal to generate an adjusted data symbol;
performing a modulo operation on the adjusted data symbol to provide a modulo signal;
selectively adjusting the value of the modulo signal in accordance with a peak-to-average ratio (PAR) control algorithm such that the adjusted modulo signal has a reduced PAR, thereby generating a new value for the precoded signal, wherein the selectively adjusting step comprises the steps of generating a control signal that has the effect of providing low-pass filter functionality and combining the control signal with the modulo signal, wherein the control signal generating step comprises the steps of generating a finite difference D(n) and selecting the control signal c(n) so as to oppose an increase of the finite difference;
filtering the precoded signal to generate a new value for the filtered precoded signal; and
coupling the precoded signal to transmitter circuits for transmission over the communication channel,
wherein the control signal is selected as follows:
if $|D(n)|>2TH_D$ and $p(n-1)>TH_D$, then $c(n)=+2N$;
if $|D(n)|>2TH_D$ and $p(n-1)<TH_D$, then $c(n)=-2N$;
otherwise, $c(n)=0$,
wherein +N is an upper bound associated with the modulo operation and −N is the lower bound associated with the modulo operation, and $TH_D$ is a difference threshold.

22. The method according to claim 15, wherein the selectively adjusting step comprises the steps of:
generating a control signal that has the effect of providing band-pass filter functionality;
combining the control signal with the received modulo signal.

23. The precoder according to claim 1, wherein the PAR controller is configured to determine a running sum based on values of the precoded signal, the PAR controller further configured to compare the running sum to a threshold and to adjust the control signal based on comparisons of the running sum to the threshold.

24. The precoder according to claim 1, wherein the PAR controller is configured to add the control signal to the modulo signal.

25. The precoder according to claim 24, wherein the control signal is based on the upper and lower amplitude boundaries.

26. The method according to claim 7, further comprising the steps of:
determining a running sum based on values of the precoded signal;
comparing the running sum to a threshold, wherein the modifying step is based on the comparing step.

27. The method according to claim 7, wherein the modifying step comprises the step of adding a control signal to the modulo signal thereby forming the precoded signal.

28. The method according to claim 15, further comprising the steps of:
determining a running sum based on values of the precoded signal;
comparing the running sum to a threshold, wherein the selectively adjusting step is based on the comparing step.

29. The method according to claim 15, wherein the selectively adjusting step comprises the step of adding a control signal to the modulo signal.

* * * * *